W. C. THOMPSON.
PIE AND CAKE LIFTING AND TURNING DEVICE.
APPLICATION FILED JUNE 26, 1908.

927,823.

Patented July 13, 1909.
2 SHEETS—SHEET 1.

Inventor
W. C. Thompson,

Witnesses

By Woodward & Chandlee
Attorneys

W. C. THOMPSON.
PIE AND CAKE LIFTING AND TURNING DEVICE.
APPLICATION FILED JUNE 26, 1908.
927,823.
Patented July 13, 1909.
2 SHEETS—SHEET 2.
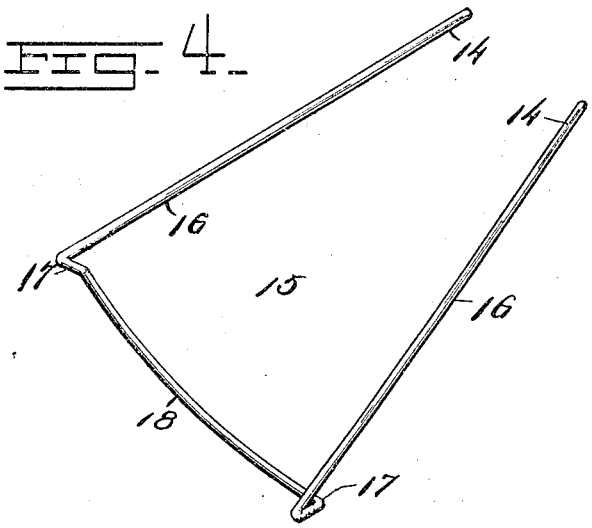
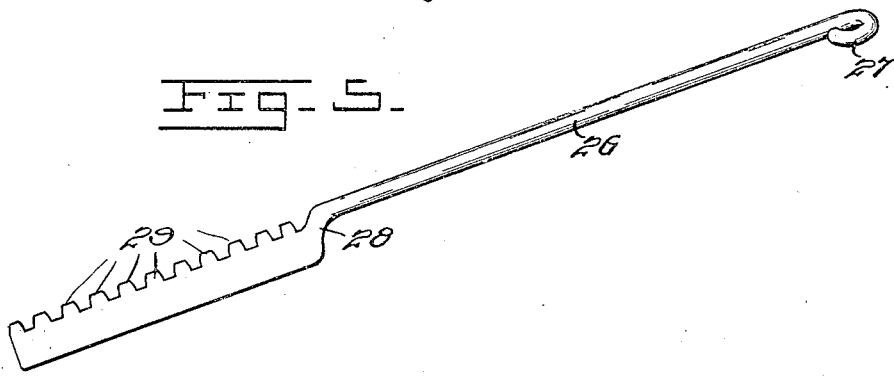
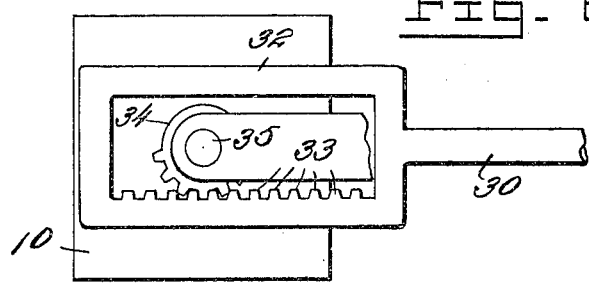
Inventor
W. C. Thompson
Witnesses
By Woodward & Chandlee
Attorneys

UNITED STATES PATENT OFFICE.

WILLIAM C. THOMPSON, OF OYSTER BAY, NEW YORK.

PIE AND CAKE LIFTING AND TURNING DEVICE.

No. 927,823.   Specification of Letters Patent.   Patented July 13, 1909.

Application filed June 26, 1908. Serial No. 440,532.

*To all whom it may concern:*

Be it known that I, WILLIAM C. THOMPSON, a citizen of the United States, residing at Oyster Bay, in the county of Nassau and State of New York, have invented certain new and useful Improvements in Pie and Cake Lifting and Turning Devices, of which the following is a specification.

This invention relates to the class of kitchen and table articles, and more particularly to a device for lifting and turning pies, cakes and the like during their process of baking, and has for an object to provide a simple device of this character whereby pies and cakes may be conveniently handled and turned to produce effective baking in ovens which bake unevenly.

A further object of this invention is to provide a device of the above described character which will be simple in construction, inexpensive to manufacture and which will be effective for the purpose intended.

Other objects and advantages will be apparent from the following description and it will be understood that changes in the specific structure shown and described may be made within the scope of the claim without departing from the spirit of the invention.

Figure 1:
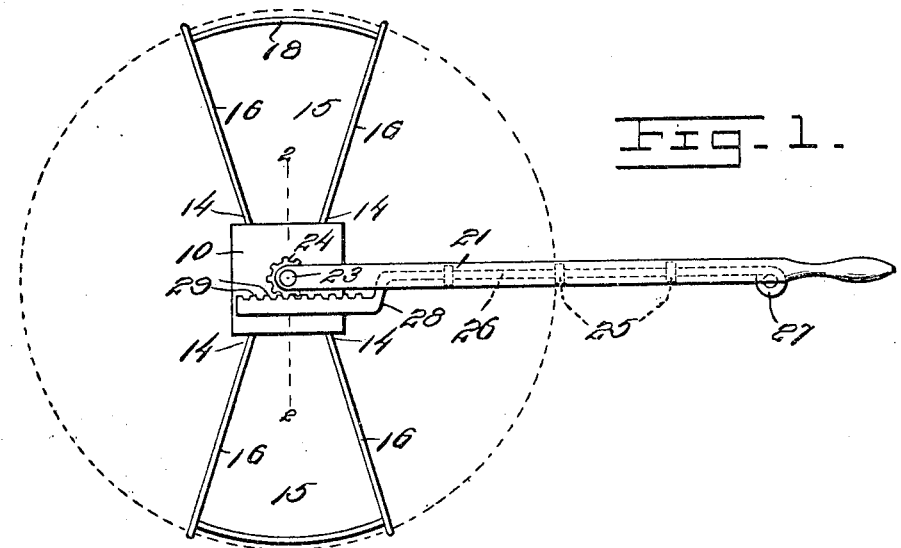
Figure 2:
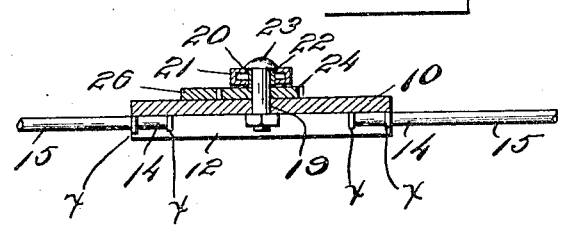
Figure 3:
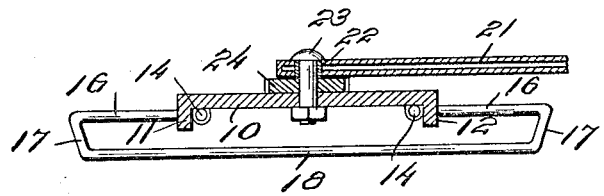

In the drawings forming a portion of this specification and in which like characters of reference indicate similar parts in the several views, Figure 1 is a top plan view of the present invention, Fig. 2 is a transverse sectional view on the line 2—2 of Fig. 1, Fig. 3 is a longitudinal sectional view, Fig. 4 is a perspective view of one of the pan engaging members, Fig. 5 is a perspective view of the rack bar, Fig. 6 is a plan view of a modified form of my invention.

Referring now to the drawings, there is shown a lifting and turning device for pies, etc., comprising a head 10 of metal, which is provided with parallel downwardly turned flanges 11 and 12 respectively at its front and rear ends. The sides of the head are thus open, and receive the ends 14 of divergent legs 16 of pan engaging members 15. These members are each formed of a single length of wire, the legs 16 being bent in an inward direction at their outer ends as shown at 17, and these portions 17 being connected by horizontally disposed arcuate portion 18. The end portions 14 are engaged in eyes X carried by the under face of the head 10 and adjacent to each of the flanges 11 and 12, these eyes being arranged in pairs adjacent to each end of the flanges. It will of course be understood that the tension of the wire would normally hold the legs 16 in spaced relation, and that when the legs are engaged in the eyes X they are moved toward each other against the tension of the wire. This tendency of the legs to separate will thus hold them against disengagement of the eyes X, although they may be readily removed when desired by giving them an outward pull sufficient to overcome the frictional engagement of the legs in the eyes. The head 10, at its center, is provided with a centrally located passage 19 disposed in line with a passage 20 formed in a hollow handle 21. The passage 20 is provided with a suitable boxing 22 which receives the upper end of a vertically disposed shaft 23. The lower end of the shaft 23 is thus journaled in the head 10, and this head is provided with a relatively small pinion 24 which is disposed concentric with the shaft 23 beneath the handle 21 at the outer end thereof.

The handle 21, upon its side, is provided with a plurality of guides 25 in which a bar 26 is slidably disposed. The bar 26, at its rearward end, is provided with a ring 27 for manipulation by the hand of the operator to be hereinafter more fully described. Adjacent to the outer end, the bar 26 is offset as shown at 28, and from this offset portion the bar is directed outwardly and lies on top of the head, and this portion of the bar is provided with a plurality of vertically disposed teeth 29 for engagement with the teeth of the pinion 24 as is obvious.

In use, should it be desired to turn a pie or the like, during its process of baking it will be understood that the pan engaging members described may be engaged with the flanges of the pan, and by the flexibility of the joint by which these pan engaging members are joined it is obvious that the weight of the pan will be sufficient to hold the pan engaging members effectively in an operative position. After the raising of a pan it is obvious that the bar 26 may be moved in a forward or rearward direction to rotate the head 10 and the pan carried thereby so that the unbaked portion of a pie may be brought or turned in a different position in an oven.

In the modified form of my invention shown in Fig. 6 a bar 30 is provided which is provided at its outer end with a hollow head 32, one side of which is provided with a plurality of vertically disposed teeth 33 arranged to engage the teeth of a mutilated gear 34 carried by a shaft 35 similar to the shaft 23 in the preferred form of my invention.

What is claimed is:—

In a pie lifting and turning device, the combination with a head formed of a metallic plate having its front and rear edges bent downwardly to produce transversely extending parallel flanges, of a pair of eyes carried by the under face of the head adjacent to each end of each flange, pan engaging members each formed of a single length of wire bent to produce outwardly divergent legs and connecting arcuate portions at the outer ends of the legs, the inner ends of the legs being engaged in the mutually adjacent pairs of eyes, one of said pan engaging members lying at each side of the head, a handle connected with the head for rotation of the head with respect to the handle and means for rotating the head.

In testimony whereof I affix my signature, in presence of two witnesses.

WILLIAM C. THOMPSON.

Witnesses:
RICHARD DOWNING, Jr.
RICHARD DOWNING.